June 28, 1932.  V. WILLOUGHBY  1,864,573
ARTICULATED CAR
Filed Dec. 19, 1930
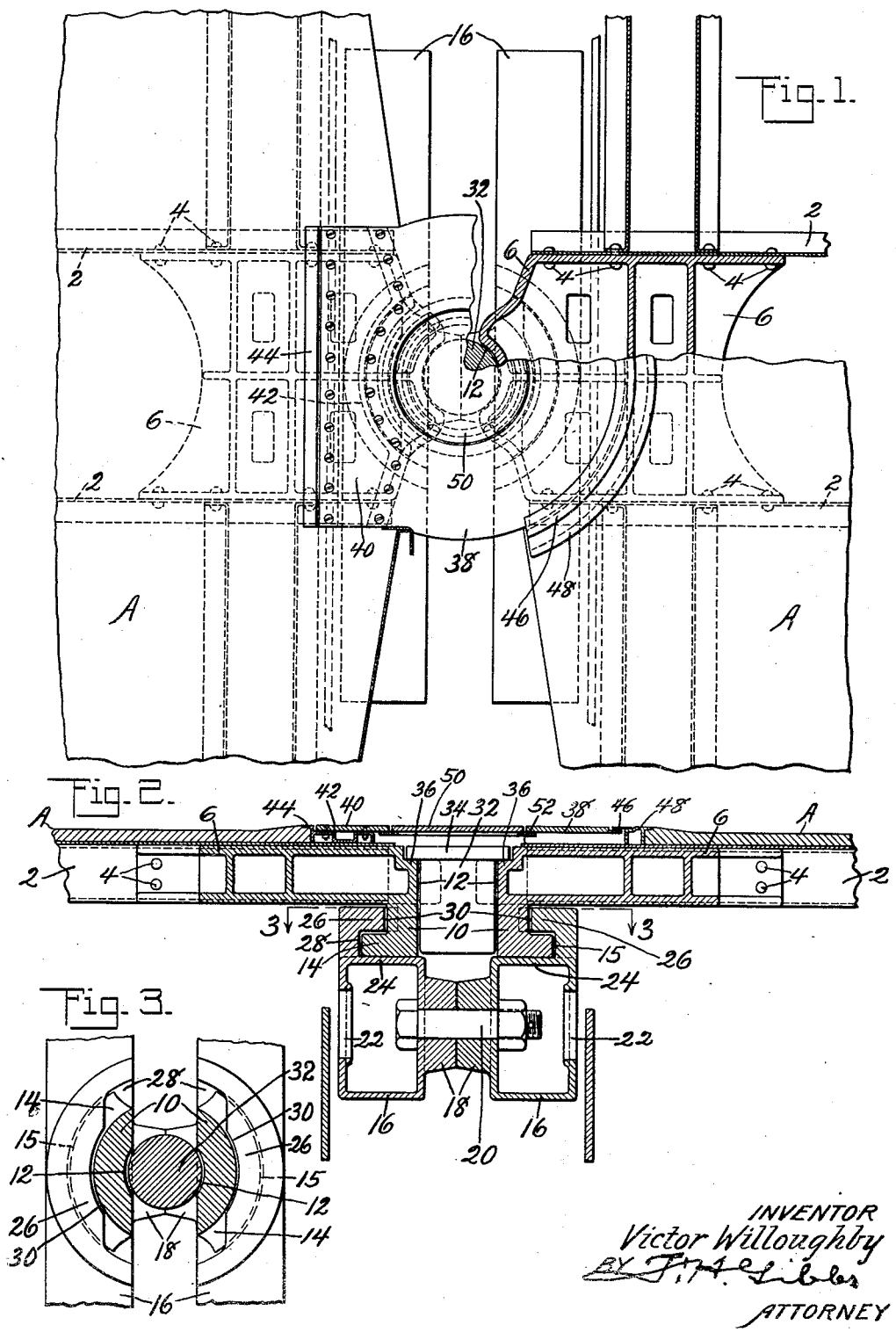
INVENTOR
Victor Willoughby
BY
ATTORNEY Patented June 28, 1932

1,864,573

UNITED STATES PATENT OFFICE

VICTOR WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW YORK

ARTICULATED CAR

Application filed December 19, 1930. Serial No. 503,465.

This invention relates to articulated cars of the type in which a pair of car bodies have their adjacent end portions supported by a common truck known in the art as a pivot truck.

One object of the present invention is the provision of an articulated car in which the adjacent end portions of two car bodies are supported by a pair of truck bolsters, the latter being connected together substantially midway of their ends.

Another object of this invention is the provision of an articulated car in which the adjacent end portions of two car bodies are supported by a pair of truck bolsters and are arranged in spaced relation and which has a spacing and buffing element arranged between the said adjacent end portions for retaining the bodies in spaced relation.

Still another object of this invention is the provision of an articulated car in which the adjacent end portons of two car bodies are retained in a predetermined spaced relation by means of a buffing element which latter is adapted to prevent excessive relative sidewise shifting of the bodies.

A further object of this invention is the provision of an articulated car in which the adjacent end portions of two car bodies are maintained and supported in a predetermined and definite spaced relation by means of a spacing and buffing element so arranged as to define the center for pivotal movement of the adjacent end portions of said car bodies.

A still further object of this invention is the provision of a new and improved body connection casting for an articulated car.

This invention also contemplates the provision of a new and improved foot plate for bridging the space between the adjacent end portions of two car bodies.

Other objects and advantages of this invention will be apparent from the following description taken in conjunction with the accompanying drawing in which:

Fig. 1 is a top plan view of parts of adjacent end portions of two car bodies, certain parts thereof being broken away and other parts being shown in section; the view also showing a pair of truck bolsters.

Fig. 2 is a central vertical sectional view through the construction illustrated in Fig. 1, and Fig. 3 is a sectional view on the line 3—3, Fig. 2.

Referring more particularly to the drawing the invention is designed for coupling together the adjacent end portions of two car bodies, portions thereof being shown more or less diagrammatically at A. Inasmuch as the specific construction of the car bodies forms no part of the present invention it is not shown in detail except for those parts which are necessary to an understanding of the present invention.

The bodies are provided with suitable underframes, including spaced members 2 defining center sills. In the instance shown the members 2 are channels and have arranged therebetween and secured thereto by suitable fasteners such as the rivets 4, body connection castings 6, the forward ends of which project beyond the ends of the bodies and have their forward ends provided with depending projections 10; vertical recesses 12 being formed in said ends and projections. The projections 10 define supporting elements or bases for the end portions of the bodies and the lower ends thereof are reversely extended to underlie the body portions of the castings and define flanges 14 the forward edges 15 of which are arcuate shaped. The rear walls or said projections, above the flanges 14, are preferably also curved or arcuate in shape as clearly shown in the drawing.

The adjacent end portions of the car bodies are adapted to be supported by a single truck and said truck is provided with a pair of bolsters 16 arranged side by side with the adjacent walls thereof provided with outwardly extending integral bosses 18 approximately midway between the ends of said bolsters. The bosses are adapted to abut each other as clearly shown in Fig. 2 and the two bolsters 16 are connected together at the bosses 18 by means of a pivot pin 20. To permit insertion of the pin and the connection of the bolsters 16, the outer walls of the latter are provided with suitable openings 22.

The upper surfaces 24 of the bolsters are provided with arcuate shaped guiding flanges 26, undercut to provide arcuate guideways 28 in which the flanges 14 of the projections 10 are arranged. As will be apparent the free edges 30 of the guides 26 are arcuate in shape to conform to the arcuate contour of the walls of the projections above the flanges 14.

For retaining the bodies in their proper spaced relation a spacing and buffing element is provided, the same comprising a pin 32 arranged between the castings 6 in the recesses 12 and having a head 34 by which it is supported on shoulders 36 formed in the upper walls of the castings at their forward ends. It will be apparent that the pivot pin 32 serves as a center for pivotal movement of each of the end portions of the adjacent car bodies and further it will be apparent that buffing shocks are taken by the pin 32 and transmitted from one body to the other thereby and from the bodies to the truck.

It is necessary to provide means whereby passengers may go from one car body to the other and therefore a foot plate 38 has been provided which bridges the space between the car bodies and in the present instance the foot plate 38, as clearly shown in Fig. 1, is substantially circular for the major portion thereof and is provided with an attaching flange 40 secured to a bracket 42 mounted at the end of one of the car bodies. The bracket 42 as shown, is formed integral with a threshhold casting 44 but this is merely by way of example as obviously the bracket 42 may be an independent unit attached in any suitable manner to the end portion of one car body.

The foot plate being attached to one of the car bodies must necessarily move therewith. Said foot plate overlaps the end portion of the adjacent car body and preferably underlies for a portion of its circumference, an arcuate sealing element 46, which may be a weather strip or the like, attached to the threshold casting 48 of said adjacent car body; the element 46 being arcuate in shape whereby when the car bodies pivot relative to each other the foot plate is free to rotate relative to the sealing element and still maintain the proper walkway for passengers.

In order to disassemble the construction shown in Fig. 2 it is necessary to remove the pin 32 and to permit this the foot plate 38 is provided with a removable section 50 which is preferably supported by an annular ring 52 secured to the under surface of the foot plate and having a margin extending beyond the limits of the opening as clearly shown in said Fig. 2.

It is believed that the construction will be fully apparent to those skilled in the art without further elaboration. With the car bodies assembled as shown in the drawing, either body may swivel relative to the other about the longitudinal center of the pivot pin 32, said longitudinal center being the center of rotation. Excessive relative vertical movement of the adjacent end portions of the car bodies is prevented by reason of the interfitting of the lower ends of the projections 10 with the guides 26 formed on the bolsters while relative sidewise shifting of the adjacent end portions of said bodies is prevented by the engagement of the pin 32 between the end portions and more particularly in the recesses formed in the forward ends of castings 6.

To disassemble the joint of the present invention the removable portion 50 of the foot plate 38 is taken away to permit withdrawal of the pin 32 from between the connection castings 6. When this has been done either car body may be moved to permit the flanges 14 of projections 10 to clear the guide 26 and then the end portion may be lifted to be freed from the truck. In assembling the device the adjacent end portions of the car bodies are inserted into position between the guides 26 and then moved so that the flanges 14 will be positioned in the guideways 28, and then the spacing and buffing element 32 is inserted between the castings 6. As before mentioned buffing shocks are transmitted from one body to the other and from the bodies to the truck by the pin 32. Pulling stresses are transmitted from one body to the other through the projections 10 and the guides 26 carried by the bolsters.

The drawing illustrates one embodiment of the invention but it is for illustrative purposes only and various changes in the form and proportions of the construction shown may be made within the scope of the appended claims without departing from the spirit of the invention.

What is claimed is:

1. In an articulated car comprising a plurality of car bodies, a truck for suporting the adjacent end portions of two of said bodies, a pair of bolsters for said truck each having a retaining flange on its upper surface defining a guideway, body supporting elements depending from the adjacent end portions of said bodies engaged in said guideways, and a spacer interposed between the adjacent end portions and body supporting elements for retaining the end portions of said bodies in spaced relation and for retaining the body supporting elements in said guideways.

2. In an articulated car comprising a plurality of car bodies, a truck for supporting the adjacent end portions of two of said bodies, a pair of bolsters for said truck each provided with a retaining flange on its upper surface defining a guideway, body supporting elements depending from the adjacent end portions of said bodies engaged in said guideways, and a buffing element interposed between and supported by the adjacent end portions for retaining the same in spaced relation and for retaining the body supporting elements in said guideways, said buffing element being adapted to transmit buffing shocks from one body to the other and from said bodies to the truck.

3. In an articulated car, a plurality of car bodies, a truck for supporting the adjacent end portions of two of said bodies, a pair of bolsters for said truck each provided with a retaining flange on its upper surface defining oppositely arranged arcuate shaped guideways, body supporting elements depending from the adjacent end portions of said bodies, said body supporting elements having arcuate shaped flanges underlying the end portions of said bodies and engaged in said guideways, and said supporting elements being capable of relative horizontal swiveling; and means for retaining said bodies in spaced relation comprising a combined spacer and buffer element supported by the said adjacent end portions and extending therebetween.

4. In an articulated car comprising a plurality of car bodies, a truck for supporting the adjacent end portions of two of said bodies, a pair of bolsters for said truck connected together at a point midway between their ends, each bolster being provided with arcuate shaped guideways on its upper surface, body connection castings secured to the adjacent end portions and provided with depending supporting elements at their forward ends adapted to fit in said guideways and to swivel horizontally therein, and a spacer interposed between the castings for retaining the bodies in proper spaced relation.

5. In an articulated car, a pair of car bodies, a truck for supporting the adjacent end portions of said bodies, a pair of truck bolsters each having an arcuate guideway on its upper surface, body connection castings secured to the adjacent end portions of said bodies having oppositely extending supporting bases arranged in said guideways and capable of horizontal swiveling therein, the forward ends of said castings being longitudinally recessed, and means for maintaining the adjacent end portions of said bodies in proper spaced relation comprising a buffing pin arranged between the castings and extending into said recesses, said pin being the center of rotation of the adjacent end portions and being adapted to prevent excessive relative sidewise shifting of the bodies.

6. In an articulated car, a pair of car bodies having their adjacent end portions supported for relative swiveling movement by a single truck, and means bridging the space between the said bodies comprising a foot plate rigidly attached to one of said bodies and lapping the other body in spaced relation thereto.

In witness whereof I have hereunto set my hand.

VICTOR WILLOUGHBY.